United States Patent
Naveen et al.

(10) Patent No.: US 10,944,673 B2
(45) Date of Patent: Mar. 9, 2021

(54) REDIRECTION OF DATA MESSAGES AT LOGICAL NETWORK GATEWAY

(71) Applicant: VMware, Inc., Palo Alto, CA (US)

(72) Inventors: Akhila Naveen, Palo Alto, CA (US); Kantesh Mundaragi, Sunnyvale, CA (US); Rahul Mishra, Mountain View, CA (US); Fenil Kavathia, Sunnyvale, CA (US); Raju Koganty, San Jose, CA (US); Pierluigi Rolando, Santa Clara, CA (US); Yong Feng, Sunnyvale, CA (US); Jayant Jain, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 56 days.

(21) Appl. No.: 16/120,281

(22) Filed: Sep. 2, 2018

(65) Prior Publication Data
US 2020/0076734 A1 Mar. 5, 2020

(51) Int. Cl.
*H04L 12/741* (2013.01)
*H04L 29/08* (2006.01)
*H04L 12/713* (2013.01)

(52) U.S. Cl.
CPC ............ *H04L 45/745* (2013.01); *H04L 67/20* (2013.01); *H04L 45/586* (2013.01)

(58) Field of Classification Search
CPC ...... H04L 45/586; H04L 45/745; H04L 67/20
See application file for complete search history.

(56) References Cited

U.S. PATENT DOCUMENTS

| | | | |
|---|---|---|---|
| 6,006,264 A | 12/1999 | Colby et al. | |
| 6,104,700 A | 8/2000 | Haddock et al. | |
| 6,154,448 A | 11/2000 | Petersen et al. | |
| 6,772,211 B2 | 8/2004 | Lu et al. | |
| 6,779,030 B1 | 8/2004 | Dugan et al. | |
| 6,826,694 B1 | 11/2004 | Dutta et al. | |
| 6,880,089 B1 | 4/2005 | Bommareddy et al. | |
| 6,985,956 B2 | 1/2006 | Luke et al. | |
| 7,013,389 B1 | 3/2006 | Srivastava et al. | |
| 7,209,977 B2 | 4/2007 | Acharya et al. | |

(Continued)

FOREIGN PATENT DOCUMENTS

| | | |
|---|---|---|
| CN | 1689369 A | 10/2005 |
| CN | 101729412 A | 6/2010 |

(Continued)

OTHER PUBLICATIONS

Author Unknown, "Datagram," Jun. 22, 2012, 2 pages, retrieved from https://web.archive.org/web/20120622031055/https://en.wikipedia.org/wiki/datagram.

(Continued)

*Primary Examiner* — Rhonda L Murphy
(74) *Attorney, Agent, or Firm* — Adeli LLP

(57) ABSTRACT

Some embodiments provide a method for forwarding a data message. The method performs a lookup to map a set of header fields of the data message to an identifier corresponding to a service that performs non-forwarding processing on data messages. The method uses a dynamically-updated data structure for the identifier to retrieve instructions for forwarding data messages to the service. The method forwards the data message according to the retrieved instructions from the data structure for the identifier.

21 Claims, 13 Drawing Sheets

(56) References Cited

U.S. PATENT DOCUMENTS

| | | |
|---|---|---|
| 7,239,639 B2 * | 7/2007 | Cox ................ H04L 45/7457 370/395.43 |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,649,890 B2 | 1/2010 | Mizutani et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasarathy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,892,706 B1 | 11/2014 | Dalal |
| 8,914,406 B1 | 12/2014 | Haugsnes et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,191,293 B2 | 11/2015 | Lovene et al. |
| 9,225,638 B2 | 12/2015 | Jain |
| 9,225,659 B2 | 12/2015 | McCanne et al. |
| 9,232,342 B2 | 1/2016 | Seed et al. |
| 9,264,313 B1 | 2/2016 | Manuguri et al. |
| 9,277,412 B2 | 3/2016 | Freda et al. |
| 9,397,946 B1 | 7/2016 | Yadav |
| 9,407,599 B2 | 8/2016 | Koponen et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,602,380 B2 | 3/2017 | Strassner |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,013,276 B2 | 7/2018 | Fahs et al. |
| 10,075,470 B2 | 9/2018 | Vaidya et al. |
| 10,079,779 B2 | 9/2018 | Zhang et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,737 B2 | 11/2018 | Jain et al. |
| 10,200,493 B2 | 2/2019 | Bendapudi et al. |
| 10,212,071 B2 * | 2/2019 | Kancherla ................ H04L 45/22 |
| 10,225,137 B2 | 3/2019 | Jain et al. |
| 10,257,095 B2 | 4/2019 | Jain et al. |
| 10,320,679 B2 | 6/2019 | Jain et al. |
| 10,341,233 B2 | 7/2019 | Jain et al. |
| 10,397,275 B2 * | 8/2019 | Jain ................ H04L 67/1097 |
| 10,516,568 B2 | 12/2019 | Jain et al. |
| 10,594,743 B2 | 3/2020 | Hong et al. |
| 10,609,091 B2 | 3/2020 | Hong et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0091396 A1 | 4/2005 | Nilakantan et al. |
| 2005/0114429 A1 | 5/2005 | Caccavale |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0104608 A1 | 5/2008 | Ryser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0265467 A1 | 10/2009 | Peles et al. |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0223364 A1 | 9/2010 | Wei |

(56) References Cited

U.S. PATENT DOCUMENTS

| | | |
|---|---|---|
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalai et al. |
| 2011/0022812 A1 | 1/2011 | Van Der et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Seraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0343378 A1 | 12/2013 | Veteikis et al. |
| 2014/0010085 A1 | 1/2014 | Kavunder et al. |
| 2014/0046997 A1 | 2/2014 | Dain et al. |
| 2014/0046998 A1 | 2/2014 | Dain et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092914 A1 | 4/2014 | Kondapalli |
| 2014/0101226 A1 | 4/2014 | Khandekar et al. |
| 2014/0101656 A1 | 4/2014 | Zhu et al. |
| 2014/0115578 A1 | 4/2014 | Cooper et al. |
| 2014/0129715 A1 | 5/2014 | Mortazavi |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0330983 A1 | 11/2014 | Zisapel et al. |
| 2014/0334485 A1 | 11/2014 | Jain et al. |
| 2014/0351452 A1 | 11/2014 | Bosch et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0023354 A1 | 1/2015 | Li et al. |
| 2015/0026345 A1 | 1/2015 | Ravinoothala et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071301 A1 | 3/2015 | Dalal |
| 2015/0109901 A1 | 4/2015 | Tan et al. |
| 2015/0124840 A1 | 5/2015 | Bergeron |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0242197 A1 | 8/2015 | Alfonso et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0057687 A1 | 2/2016 | Horn et al. |
| 2016/0080253 A1 | 3/2016 | Wang et al. |
| 2016/0087888 A1 | 3/2016 | Jain et al. |
| 2016/0094384 A1 | 3/2016 | Jain et al. |

(56) References Cited

U.S. PATENT DOCUMENTS

| | | |
|---|---|---|
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0119226 A1 | 4/2016 | Guichard et al. |
| 2016/0134528 A1 | 5/2016 | Lin et al. |
| 2016/0149816 A1 | 5/2016 | Roach et al. |
| 2016/0164787 A1 | 6/2016 | Roach et al. |
| 2016/0173373 A1 | 6/2016 | Guichard et al. |
| 2016/0182684 A1 | 6/2016 | Connor et al. |
| 2016/0197839 A1 | 7/2016 | Li et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0277210 A1 | 9/2016 | Lin et al. |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0337249 A1 | 11/2016 | Zhang et al. |
| 2016/0344565 A1 | 11/2016 | Batz et al. |
| 2016/0352866 A1 | 12/2016 | Gupta et al. |
| 2016/0366046 A1 | 12/2016 | Anantharam et al. |
| 2016/0378537 A1 | 12/2016 | Zou |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064749 A1 | 3/2017 | Jain et al. |
| 2017/0126497 A1 | 5/2017 | Dubey et al. |
| 2017/0126522 A1 | 5/2017 | McCann et al. |
| 2017/0134538 A1 | 5/2017 | Mahkonen et al. |
| 2017/0142012 A1 | 5/2017 | Thakkar et al. |
| 2017/0149582 A1 | 5/2017 | Cohn et al. |
| 2017/0149675 A1 | 5/2017 | Yang |
| 2017/0208011 A1 | 7/2017 | Bosch et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250902 A1 | 8/2017 | Rasanen et al. |
| 2017/0264677 A1 | 9/2017 | Li |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0317926 A1 | 11/2017 | Penno et al. |
| 2017/0317954 A1 | 11/2017 | Masurekar et al. |
| 2017/0324651 A1 | 11/2017 | Penno et al. |
| 2017/0331672 A1 | 11/2017 | Fedyk et al. |
| 2017/0346764 A1 | 11/2017 | Tan et al. |
| 2017/0364794 A1 | 12/2017 | Mahkonen et al. |
| 2017/0373990 A1 | 12/2017 | Jeuk et al. |
| 2018/0041524 A1 | 2/2018 | Reddy et al. |
| 2018/0091420 A1 | 3/2018 | Drake et al. |
| 2018/0124061 A1 | 5/2018 | Raman et al. |
| 2018/0145899 A1 | 5/2018 | Rao |
| 2018/0159733 A1 | 6/2018 | Poon et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0198692 A1* | 7/2018 | Ansari .................... H04L 67/02 |
| 2018/0198705 A1 | 7/2018 | Wang et al. |
| 2018/0213040 A1 | 7/2018 | Pak et al. |
| 2018/0234360 A1 | 8/2018 | Narayana et al. |
| 2018/0248755 A1 | 8/2018 | Hecker et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0302242 A1 | 10/2018 | Hao et al. |
| 2018/0337849 A1 | 11/2018 | Sharma et al. |
| 2018/0349212 A1 | 12/2018 | Liu et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0036819 A1 | 1/2019 | Kantherla et al. |
| 2019/0068500 A1 | 2/2019 | Hira |
| 2019/0097838 A1 | 3/2019 | Sahoo et al. |
| 2019/0132220 A1 | 5/2019 | Boutros et al. |
| 2019/0132221 A1 | 5/2019 | Boutros et al. |
| 2019/0140947 A1 | 5/2019 | Zhuang et al. |
| 2019/0149512 A1 | 5/2019 | Sevinc et al. |
| 2019/0166045 A1 | 5/2019 | Peng et al. |
| 2019/0173778 A1 | 6/2019 | Faseela et al. |
| 2019/0229937 A1 | 7/2019 | Nagarajan et al. |
| 2019/0238363 A1 | 8/2019 | Boutros et al. |
| 2019/0238364 A1 | 8/2019 | Boutros et al. |
| 2019/0288947 A1 | 9/2019 | Jain et al. |
| 2019/0306036 A1 | 10/2019 | Boutros et al. |
| 2019/0306086 A1* | 10/2019 | Boutros .................... H04L 12/66 |
| 2019/0342175 A1 | 11/2019 | Wan et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0076684 A1 | 3/2020 | Naveen et al. |
| 2020/0145331 A1 | 5/2020 | Bhandari et al. |
| 2020/0162318 A1 | 5/2020 | Patil et al. |
| 2020/0204492 A1 | 6/2020 | Sarva et al. |

FOREIGN PATENT DOCUMENTS

| | | |
|---|---|---|
| CN | 103516807 A | 1/2014 |
| CN | 103795805 A | 5/2014 |
| EP | 2426956 A1 | 3/2012 |
| JP | 2005311863 A | 11/2005 |
| WO | 9918534 A2 | 4/1999 |
| WO | 2008095010 A1 | 8/2008 |
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2020046686 A1 | 3/2020 |

OTHER PUBLICATIONS

Author Unknown, "AppLogic Features," Jul. 2007, 2 pages. 3TERA, Inc.
Author Unknown, "Enabling Service Chaining on Cisco Nexus 1000V Series," Month Unknown, 2012, 25 pages, Cisco.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Greenberg, Albert, et al., "VL2: A Scalable and Flexible Data Center Network," SIGCOMM '09, Aug. 17-21, 2009, 12 pages, ACM, Barcelona, Spain.
Guichard, J., et al., "Network Service Chaining Problem Statement," Network Working Group, Jun. 13, 2013, 14 pages, Cisco Systems, Inc.
Halpern, J., et al., "Service Function Chaining (SFC) Architecture," draft-ietf-sfc-architecture-02, Sep. 20, 2014, 26 pages, IETF.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Kumar, S., et al., "Service Function Chaining Use Cases in Data Centers," draft-ietf-sfc-dc-use-cases-01, Jul. 21, 2014, 23 pages, IETF.

(56) References Cited

OTHER PUBLICATIONS

Liu, W., et al., "Service Function Chaining (SFC) Use Cases," draft-liu-sfc-use-cases-02, Feb. 13, 2014, 17 pages, IETF.
Non-Published Commonly Owned International Patent Application PCT/US2019/047586, filed Aug. 21, 2019, 46 pages, VMware, Inc.
Non-Published Commonly Owned U.S. Appl. 15/937,615, filed Mar. 27, 2018, 42 pages, Nicira, Inc.
Non-Published Commonly Owned U.S. Appl. No. 15/937,621, filed Mar. 27, 2018, 42 pages, Nicira, Inc.
Non-Published Commonly Owned U.S. Appl. No. 16/005,628, filed Jun. 11, 2018, 44 pages, Nicira, Inc.
Non-Published Commonly Owned U.S. Appl. No. 16/005,636, filed Jun. 11, 2018, 45 pages, Nicira, Inc.
Non-Published Commonly Owned U.S. Appl. No. 16/120,283, filed Sep. 2, 2018, 46 pages, VMware, Inc.
Non-Published Commonly Owned U.S. Appl. No. 16/427,294, filed May 30, 2019, 73 pages, Nicira, Inc.
Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Non-Published Commonly Owned U.S. Appl. No. 16/816,067, filed Mar. 11, 2020, 55 pages, Nicira, Inc.
Casado, Martin, et al., "Virtualizing the Network Forwarding Plane," Dec. 2010, 6 pages.
Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.

\* cited by examiner

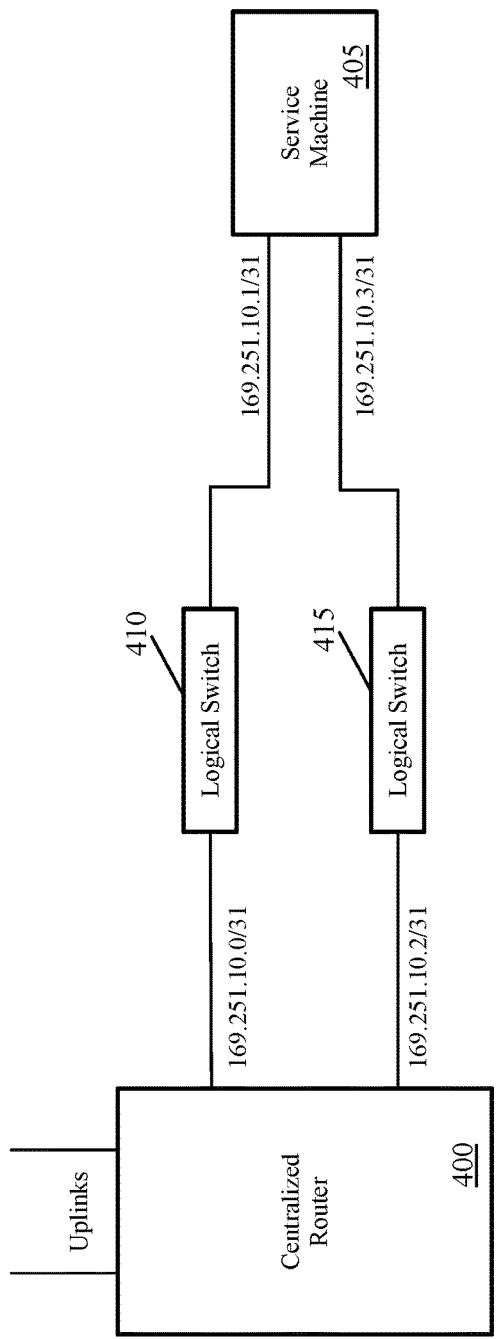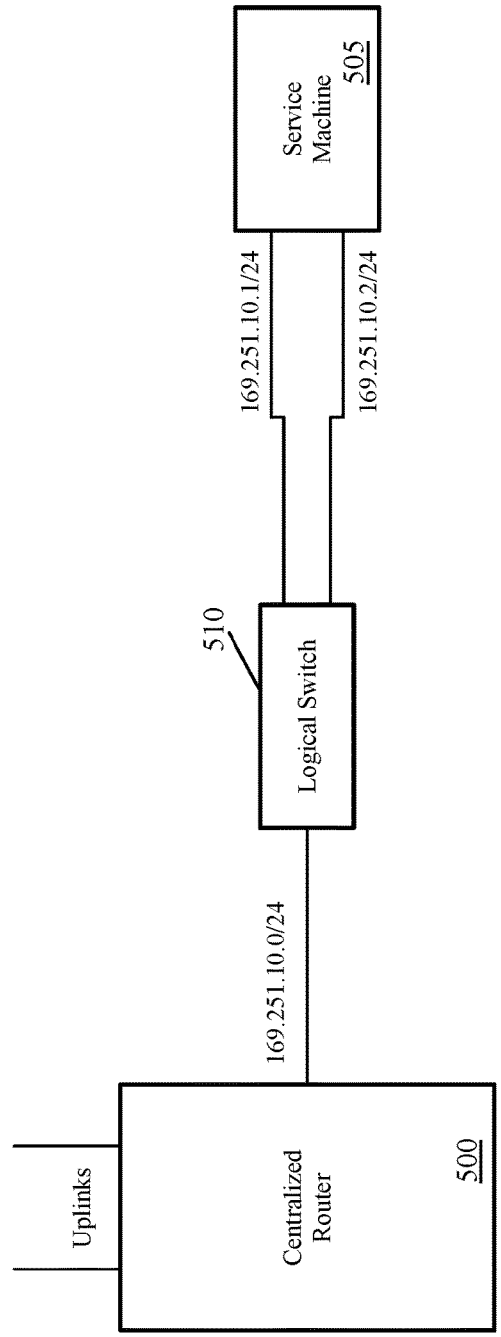

REDIRECTION OF DATA MESSAGES AT LOGICAL NETWORK GATEWAY

BACKGROUND

Many corporations and other entities use software-defined datacenters (e.g., on-premises datacenters and/or public cloud datacenters) to host their networks. The providers of the software-defined datacenters typically provide various network security options, but some entities will want to incorporate existing third-party security services (or other services) into their hosted networks. Thus, techniques for more easily incorporating such services into virtual networks would be useful.

BRIEF SUMMARY

Some embodiments provide a network management and control system that enables integration of third-party service machines for processing data traffic entering and/or exiting a logical network. These third-party services may include various types of non-packet-forwarding services, such as firewalls, virtual private network (VPN) service, network address translation (NAT), load balancing, etc. In some embodiments, the network management and control system manages the integration of these service machines, but does not manage the life cycle of the machines themselves.

In some embodiments, the logical network includes at least one logical switch to which logical network endpoints (e.g., data compute nodes such as virtual machines, containers, etc.) connect as well as a logical router for handling data traffic entering and/or exiting the logical network. In addition, the logical network may include multiple logical switches that logically connect to each other through either the aforementioned logical router or another logical router. In some embodiments, the logical network includes multiple tiers of logical routers. Logical routers in a first tier connect groups of logical switches (e.g., the logical switches of a particular tenant). These first-tier logical routers connect to logical routers in a second tier for data traffic sent to and from the logical network (e.g., data traffic from external clients connecting to web servers hosted in the logical network, etc.). The second-tier logical routers are implemented at least partly in a centralized manner for handling the connections to the external networks, and in some embodiments the third-party service machines attach to the centralized components of these logical routers. The logical networks of other embodiments include only a single tier of logical routers, to which the third-party services attach.

In some embodiments, the network management and control system (referred to subsequently as a network control system) receives both (i) configuration data defining the logical network (i.e., the logical switches, attachment of data compute nodes to the logical switches, logical routers, etc.) as well as (ii) configuration data attaching a third-party service to a logical router (i.e., the logical router that handles connections to external networks). Based on this configuration data, the network control system configures various managed forwarding elements to implement the logical forwarding elements (the logical switches, distributed aspects of the logical routers, etc.) as well as other packet processing operations for the logical network (e.g., distributed firewall rules). In addition, some embodiments configure a particular managed forwarding element operating on a gateway machine to implement a centralized logical routing component that handles the connection of the logical network to one or more external networks. This managed forwarding element on the gateway machine is also configured to redirect (e.g., using policy-based routing) at least a subset of this ingress and/or egress data traffic between the logical network and the external networks to the attached third-party service via a separate interface of the gateway.

In some embodiments, receiving the configuration data to attach the third-party service includes several separate configuration inputs (e.g., from an administrator). After the logical router is configured, some embodiments receive configuration data (i) defining a service attachment interface for the logical router, (ii) defining a logical switch to which the service attachment interface connects, (iii) defining the service interface (e.g., the interface of the service machine to which data traffic is redirected), and (iv) connecting the service attachment interface of the logical router and the service interface to the logical switch. In addition, in some embodiments, the administrator defines a rule or set of rules specifying which ingress and/or egress traffic is redirected to the service interface.

Some embodiments enable multiple services to be connected to the logical router, using various different topologies. For instance, multiple services may be connected to the same logical switch, in which case these services all have interfaces in the same subnet and can send data traffic directly between each other if configured to do so. In this setup, the logical router can have a single interface that connects to the logical switch (for traffic to all of the services) or a separate interface connected to the logical switch for each attached service. In other cases, separate logical switches can be defined for each service (with separate logical router interfaces connected to each of the logical switches). In addition, multiple interfaces can be defined for each service machine, for handling different sets of traffic (e.g., traffic to/from different external networks or different logical network subnets).

In addition, the service machines may be connected to the logical router via different types of connections in some embodiments. Specifically, some embodiments allow for service machines to be connected in either (i) an L2 bump-in-the-wire mode or (ii) a L3 one-arm mode. In the L2 mode, two interfaces of the logical router are connected to two separate interfaces of the service machine via two separate logical switches, and data traffic sent to the service machine via one of the interfaces and received back from the service machine via the other interface. Data traffic may be sent to the service machine via one interface for traffic entering the logical network and via the other interface for traffic exiting the logical network. In the L3 mode, a single interface is used on the logical router for each connection with the service machine.

Once configured, the gateway redirects some or all of the data traffic between the logical network and external networks to the service machine. As mentioned, some embodiments use a set of policy-based routing (PBR) rules to determine whether or not to redirect each data message. In some embodiments, the gateway applies these PBR rules to outgoing data messages after performing logical routing for the data messages, and applies the PBR rules to incoming data messages prior to performing logical routing and/or switching for incoming data messages.

That is, for an outgoing data message, the gateway performs logical switching (if required), then logical routing for the routing component that connects to the external network to determine that the data message is in fact directed outside of the logical network, then applies the PBR rules to determine whether to redirect the data message to a service. If the data message is redirected, then upon its return from the service (if the data message is not dropped/blocked by the service) the gateway forwards the data message to the external network.

For an incoming data message, the gateway applies the PBR rules to determine whether to redirect the data message to a service before processing the data message through any of the logical forwarding elements. If the data message is redirected, then upon its return from the service (if the data message is not dropped/blocked by the service) the gateway then performs logical routing and switching, etc. to the data message to determine how to forward the data message to the logical network.

In some embodiments, the PBR rules use a two-stage lookup to determine whether to redirect a data message (and to which interface to redirect the data message). Specifically, rather than the PBR rules (i.e., routing rules based on header fields other than destination network address) providing the redirection details, each rule specifies a unique identifier. Each identifier corresponds to a service machine, and the gateway stores a dynamically-updated data structure for each identifier. These data structures, in some embodiments, indicate the type of connection to the service (e.g., L2 bump-in-the-wire or L3 one-arm), a network address for the interface of the service to which the data message is redirected (for L2 mode, some embodiments use a dummy network address that corresponds to the data link layer address of the return service attachment interface of the gateway), dynamically-updated status data, and a failover policy. The status data is dynamically updated based on the health/reachability of the service, which may be tested using a heartbeat protocol such as bidirectional forwarding detection (BFD). The failover policy, in some embodiments, specifies what to do with the data message if the service is not reachable. These failover policy options may include, e.g., drop the data message, forward the data message to its destination without redirection to the service, redirect to a backup service machine, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 conceptually illustrates a centralized routing component with two service attachment interfaces that connect to two separate service endpoint interfaces of a third-party service machine via two separate logical switches.

FIG. 5 conceptually illustrates a centralized routing component with one service attachment interface that connects to two separate interfaces of a third-party service machine via one logical switch.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network management and control system that enables integration of third-party service machines for processing data traffic entering and/or exiting a logical network. These third-party services may include various types of non-packet-forwarding services, such as firewalls, virtual private network (VPN) service, network address translation (NAT), load balancing, etc. In some embodiments, the network management and control system manages the integration of these service machines, but does not manage the life cycle of the machines themselves (hence referring to these service machines as third-party services).

In some embodiments, the logical network includes at least one logical switch to which logical network endpoints (e.g., data compute nodes such as virtual machines, containers, etc.) connect as well as a logical router for handling data traffic entering and/or exiting the logical network. In addition, the logical network may include multiple logical switches that logically connect to each other through either the aforementioned logical router or another logical router.

Figure 1:
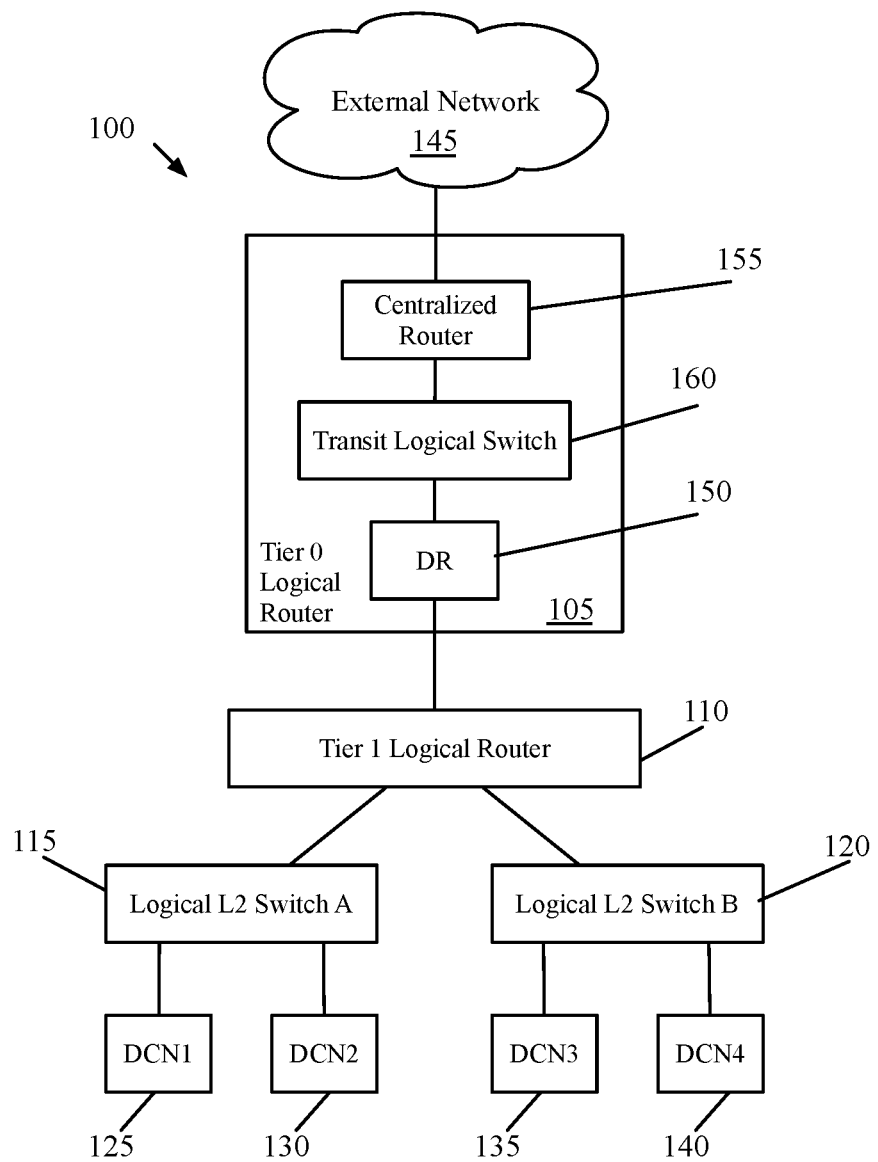
FIG. 1 conceptually illustrates an example logical network of some embodiments to which third-party services can be connected.

FIG. 1 conceptually illustrates an example logical network 100 of some embodiments, to which third-party services can be connected. As shown, this logical network 100 includes a tier-0 logical router 105 (also referred to as a provider logical router), a tier-1 logical router 110 (also referred to as a tenant logical router), and two logical switches 115 and 120. Data compute nodes (DCNs) 125-140 (e.g., virtual machines, containers, etc.) are attached to each of the logical switches 115 and 120. These data compute nodes 125 exchange data messages with each other and with one or more external networks 145 through a physical network that implements this logical network (e.g., within a datacenter).

The logical network 100 represents an abstraction of a network as configured by a user of the network management and control system of some embodiments. That is, in some embodiments, a network administrator configures the logical network 100 as a conceptual set of logical switches, routers, etc., with policies applied to these logical forwarding elements. The network management and control system generates configuration data for physical managed forwarding elements (e.g., software virtual switches operating in the virtualization software of host machines, virtual machines and/or bare metal machines operating as logical network gateways, etc.) to implement these logical forwarding elements. For instance, when a DCN 125-140 hosted on a physical host machine sends a data message, in some embodiments a managed forwarding element executing in the virtualization software of the host machine processes the data message to implement the logical network. The managed forwarding element would apply the logical switch configuration for the logical switch to which the DCN attaches, then the tier-1 logical router configuration, etc. to determine the destination of the data message.

In some embodiments, as in this example, the logical network includes multiple tiers of logical routers. Logical routers in a first tier (e.g., the tier-1 logical router 110) connect groups of logical switches (e.g., the logical switches of a particular tenant). These first-tier logical routers connect to logical routers in a second tier (e.g., the tier-0 logical router 105) for data traffic sent to and from the logical network (e.g., data traffic from external clients connecting to web servers hosted in the logical network, etc.).

The network management and control system of some embodiments (referred to subsequently as a network control system) defines multiple routing components for at least some of the logical routers. Specifically, the tier-0 logical router 105 in this example has a distributed routing component 150 ("distributed router") and a centralized routing component 155, which are connected by an internal logical switch 160 referred to as a transit logical switch. In some cases, multiple centralized routers are defined for a tier-0 logical router, each of which connects to the transit logical switch 160. For instance, some embodiments define two centralized routers, one active and one standby.

In some embodiments, the distributed router 150 and the transit logical switch 160 are implemented in a distributed manner (as with the logical switches 115 and 120, and the tier-1 logical router 110), meaning that the first-hop managed forwarding element for a data message applies the policies of those logical forwarding elements to the data message. The centralized router 155, however, is implemented in a centralized manner (i.e., a single host machine implements each such centralized router). These centralized routers handle the connections of the logical network to external networks (e.g., to other logical networks implemented at the same or other datacenters, to external web clients, etc.). The centralized router may perform various stateful services (e.g., network address translation, load balancing, etc.) as well as exchange routes with one or more external routers (using, e.g., BGP or OSPF). Different embodiments may implement the centralized router using a bare metal machine, a virtual machine, a virtual switch executing in virtualization software of a host machine, or other contexts.

As mentioned, some embodiments allow the administrator to use the network control system to attach third-party services to the logical routers. In some such embodiments, these third-party services are attached to centralized routers that handle data traffic between logical network endpoints and external networks (e.g., the centralized router 155 of a tier-0 router). While the subsequent discussion primarily relates to connection of the third-party services to tier-0 logical routers, in some embodiments the third-party services may also be connected to tier-1 logical routers.

Figure 2:
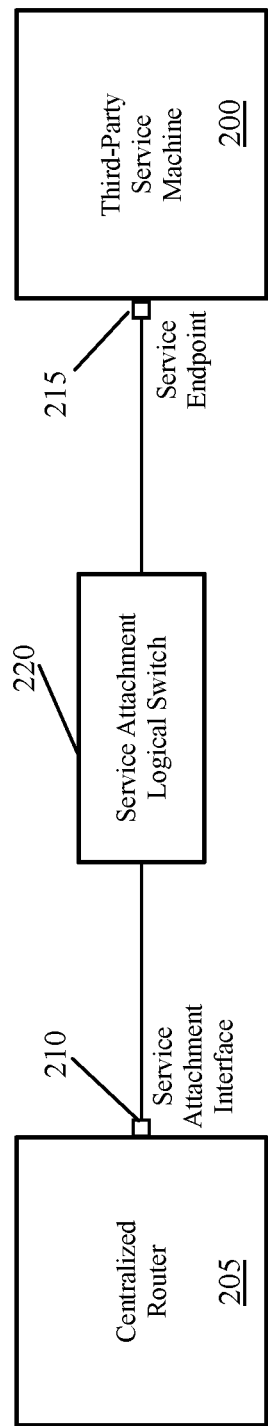
FIG. 2 conceptually illustrates an example of connecting a third-party service machine to a centralized router.

FIG. 2 conceptually illustrates an example of connecting a third-party service machine 200 to a centralized router 205. Specifically, in some embodiments, a network administrator defines a service attachment interface 210 on the logical router, a service endpoint 215 for the third-party service machine, a specific logical switch 220 for the service attachment, and attaches both the service attachment interface 210 and the service endpoint 215 to the logical switch 220. In some embodiments, an administrator provides this information through application programming interfaces (APIs) of a management plane of the network control system (e.g., using a network management application user interface that translates user interactions into API calls to the management plane).

In some embodiments, the management plane receives both (i) configuration data defining the logical network (i.e., the logical switches, attachment of data compute nodes to the logical switches, logical routers, etc.) as well as the configuration data attaching one or more third-party services to the logical router that handles connections of the logical network to external networks. Based on this configuration data, the network control system configures various managed forwarding elements to implement the logical forwarding elements (the logical switches, distributed aspects of the logical routers, etc.) as well as other packet processing operations for the logical network (e.g., distributed firewall rules). In some embodiments, the management plane generates configuration data based on the inputs and provides this configuration data to a central control plane (e.g., a set of centralized controllers). The central control plane identifies the managed forwarding elements that require each atomic piece of configuration data, and distributes the configuration data to local controllers for each identified managed forwarding element. These local controllers are then responsible for configuring the managed forwarding elements (including the gateway machine that implements the centralized router) to implement the logical forwarding elements of the logical network, including redirecting appropriate data messages to the third-party services (e.g., according to policy-based routing rules provided by the administrator).

Figure 3:
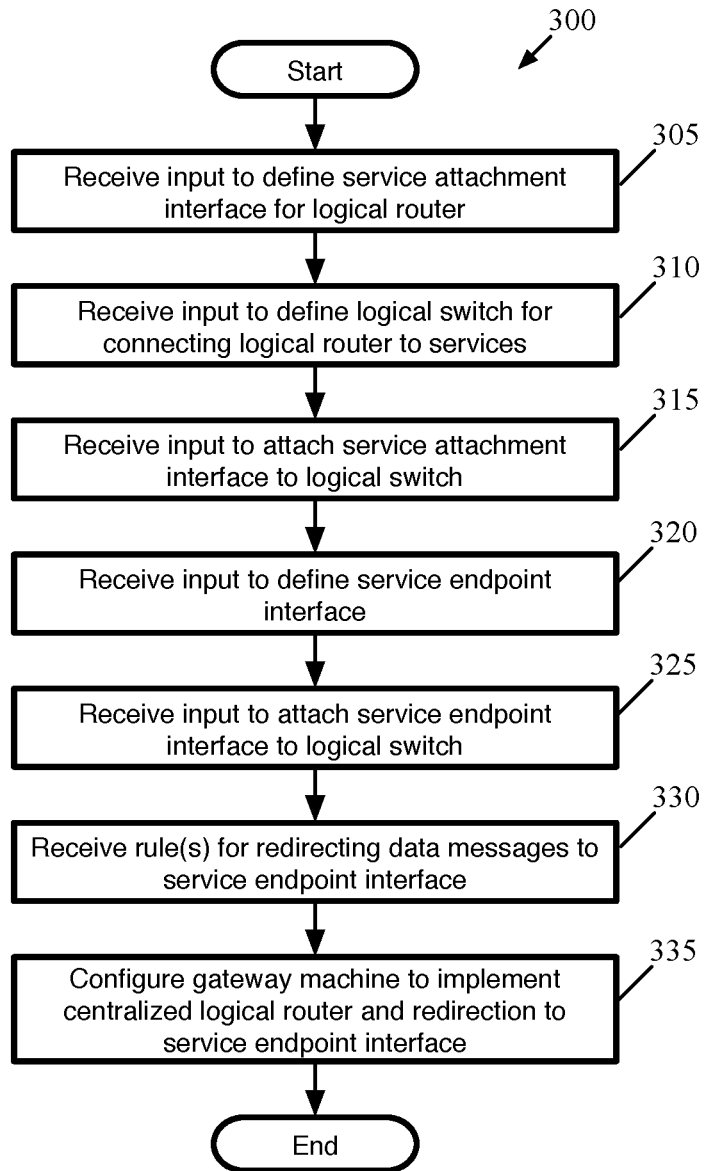
FIG. 3 conceptually illustrates a process of some embodiments for configuring a gateway machine of a logical network to redirect ingress and/or egress data traffic to a third-party service machine.

In some embodiments, receiving the configuration data to attach the third-party service includes several separate configuration inputs (e.g., from an administrator). FIG. 3 conceptually illustrates a process 300 of some embodiments for configuring a gateway machine of a logical network to redirect ingress and/or egress data traffic to a third-party service machine. In some embodiments, the process 300 is performed by the management plane of a network control system, which receives input through API calls.

In the description of this process, it is assumed that a logical network has already been configured, and that this logical network includes a logical router with at least one centralized component configured to handle data traffic entering and exiting the logical network. Some embodiments configure particular managed forwarding elements operating on gateway machines to implement these centralized logical routing components that handle the connection of the logical network to one or more external networks.

As shown, the process 300 begins by receiving (at 305) input to define a service attachment interface for a logical router. In some embodiments, a service attachment interface is a specialized type of interface for the logical router. In different embodiments, the administrator either defines this service attachment interface on a particular centralized component or on the logical router generally. In the latter case, the management plane either applies the interface to a specific one of the components (e.g., if the administrator defines that the service attachment interface will only handle traffic sent to or from a particular uplink interface of the logical router that is assigned to a particular centralized component) or creates separate interfaces for each of the centralized components of the logical router. For instance, in some embodiments, active and standby centralized routing components are defined, and interfaces are created on each of these components.

Next, the process 300 receives (at 310) input to define a logical switch for connecting the logical router to third-party services. In addition, the process receives (at 315) input to attach the service attachment interface to this logical switch. In some embodiments, this logical switch is created similarly to the logical switches of the logical network, to which data compute nodes (e.g., VMs, etc.) attach. In other embodiments, the logical switch is defined by the administrator as a specific service attachment logical switch. This logical switch has a privately allocated subnet that (i) includes the network address of the service attachment interface that is attached to the logical switch and (ii) only needs to include enough network addresses for any interfaces of third-party services and any service attachment interfaces that connect to the logical switch. For instance, as shown below, using Classless Inter-Domain Routing (CIDR) notation, a logical switch that connects a single logical router interface to a single third-party service interface could be a "/31" subnet. Even if the logical router performs route advertisement to external physical routers (e.g., using BGP or OSPF) for logical network subnets, the subnets for the service attachment logical switches are not advertised (or entered into the routing tables for the various logical router tiers) in some embodiments.

In some embodiments, if the logical router includes multiple centralized components (e.g., active and standby components) and a service attachment interface corresponds to interfaces on each of these components, then attaching the service attachment interface actually attaches each of these interfaces to the logical switch. In this case, each of the centralized component interfaces has a separate network address in the subnet of the logical switch.

Next, the process 300 receives (at 320) input to define a service endpoint interface, and receives (at 325) input to attach this service endpoint interface to the logical switch (to which the service attachment interface of the logical router is attached). In some embodiments, this service endpoint interface represents an interface on a third-party service machine. In some embodiments, when an administrator defines an endpoint interface to which a centralized routing component will connect, these interfaces can either be service endpoint interfaces (also referred to as logical endpoint interfaces, that correspond to service machines and connect to service attachment interfaces through a logical switch) or external interfaces (also referred to as virtual endpoint interfaces, which correspond to network addresses reachable from the centralized component. External router interfaces are examples of these latter interfaces.

In addition, some embodiments require the administrator to define the third-party service machine (either through the network control system or through a separate datacenter compute manager). For example, in some embodiments the network administrator defines both a service type as well as a service instance (e.g., an instance of that service type). As noted above, the service endpoint interface should also have a network address within the subnet of the logical switch to which that interface is attached.

It should be understood that operations 305-325 need not occur in the specific order shown in FIG. 3. For instance, a network administrator could initially create both of the interfaces (the service attachment interface on the logical router as well as the service endpoint interface representing the third-party service), then subsequently create the logical switch and attach the interfaces to this logical switch.

In addition, the process 300 receives (at 330) one or more rules for redirecting data messages to the service endpoint interface. In some embodiments, these are policy-based routing rules that (i) specify which ingress and/or egress traffic will be redirected to the service interface and (ii) are applied by the gateway machine separately from its usual routing operations. In some embodiments, the administrator defines the redirection rules in terms of one or more data message header fields, such as the source and/or destination network addresses, source and/or destination transport layer ports, transport protocol, interface on which a data message is received, etc. For each service interface, an administrator may create one redirection rule or multiple rules. For instance, the redirected data messages could include all incoming and/or outgoing data messages for a particular uplink, only data messages sent from or to a specific logical switch subnet, etc.

Finally, after receiving the above-described configuration data, the process 300 configures (at 335) the gateway machine to implement the centralized logical router and the redirection to the service endpoint interface. The process 300 then ends. If multiple centralized routing components have interfaces attached to the logical switch for the service endpoint, then the gateway machine for each of these components is configured. In some embodiments, the management plane generates configuration data for the service attachment interface and the redirection rules and provides this information to the central control plane. The central control plane identifies each gateway machine that requires the information and provides the appropriate configuration data to the local controller for that gateway machine. The local controller of some embodiments converts this configuration data to a format readable by the gateway machine (if it is not already in such a format) and directly configures the gateway machine to implement the policy-based routing rules.

Some embodiments enable multiple services to be connected to the logical router, using various different topologies. For instance, multiple services may be connected to the same logical switch, in which case these services all have interfaces in the same subnet and can send data traffic directly between each other if configured to do so. In this setup, the logical router can have a single interface that connects to the logical switch (for traffic to all of the services) or a separate interface connected to the logical switch for each attached service. In other cases, separate logical switches can be defined for each service (with separate logical router interfaces connected to each of the logical switches). In addition, multiple interfaces can be defined for each service machine, for handling different sets of traffic (e.g., traffic to/from different external networks or different logical network subnets).

FIGS. 4-7 conceptually illustrate several different such topologies for connecting a centralized routing component of a logical router to one or more service machines. Each of these figures illustrates one centralized router connected to one or more logical switches to which one or more service machines are also connected. It should be understood that these figures represent a logical view of the connections, and that the gateway machine implementing the centralized router would also implement the logical switch(es) in some embodiments.

FIG. 4 conceptually illustrates a centralized routing component 400 with two service attachment interfaces that connect to two separate service endpoint interfaces of a third-party service machine 405 via two separate logical switches 410 and 415. This topology essentially uses a separate service attachment interface and separate logical switch for each connection to the third-party service. In this example, each of the logical switches 410 and 415 is assigned a "/31" subnet, which includes two network addresses. Because each of the logical switches is specifically created for connecting one service attachment interface of the centralized routing component 400 to the service machine 405, only two addresses are needed for each switch. In some embodiments, the redirection rules for the router redirect data messages sent to and from each of the uplinks to a different interface of the third-party service machine (and thus use a different one of the service attachment interfaces).

FIG. 5 conceptually illustrates a centralized routing component 500 with one service attachment interface that connects to two separate interfaces of a third-party service machine 505 via one logical switch 510. In some embodiments, the administrator creates one logical switch for each third-party service machine with one service attachment interface on the centralized router component, but defines multiple service endpoint interfaces for that third-party service machine. In this case, the logical switch subnet accommodates a larger number of network addresses (in the present example, a "/24" subnet is used). In some embodiments, the redirection rules are set up to redirect data messages sent to and from each of the uplinks to a different interface of the third-party service machine via the same service attachment interface and logical switch. In some embodiments, using a setup with multiple service endpoint interfaces on the service machine that attach to the same logical switch requires that the third-party service machine use separate routing tables (e.g., virtual routing and forwarding instances) for each interface.

Figure 6:
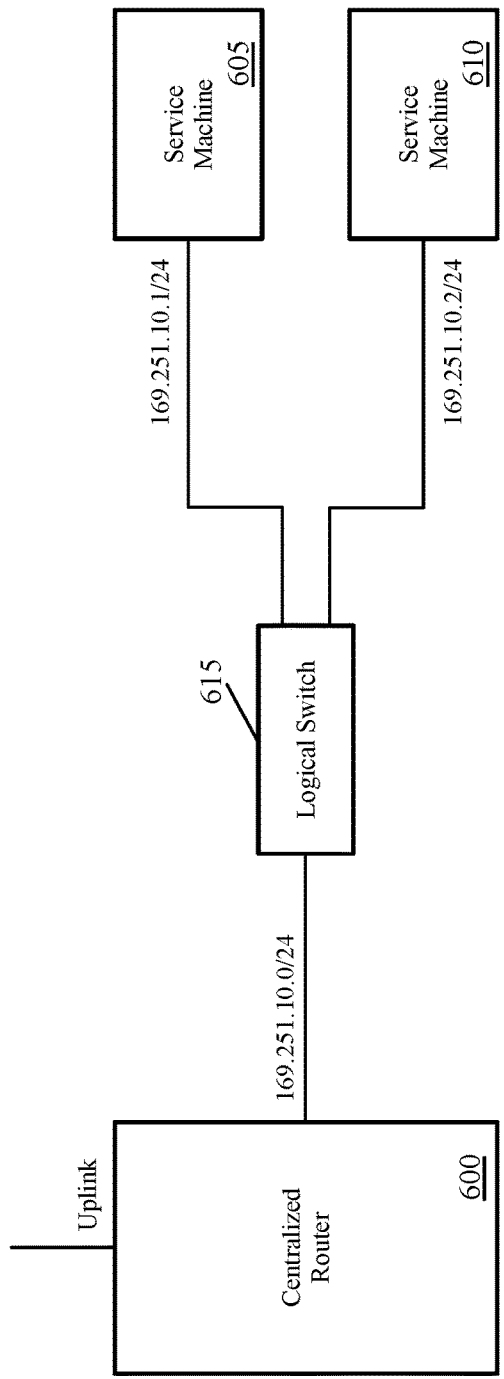
FIG. 6 conceptually illustrates a centralized routing component with one service attachment interface that connects to interfaces of two different third-party service machines via one logical switch.

FIG. 6 conceptually illustrates a centralized routing component 600 with one service attachment interface that connects to interfaces of two different third-party service machines 605 and 610 via one logical switch 615. The service machines 605 and 610 in this scenario could provide two separate services (e.g., a firewall and a cloud extension service) or be master and standby machines for a single high-availability service. In some embodiments, because the interfaces of the service machines 605 and 610 are on the same logical switch, data messages can also be sent from one service to the other. In this example, the centralized routing component 600 has a single uplink; some embodiments using this configuration would include two service attachments and two logical switches that each connect to (different) interfaces of both service machines to handle data messages received or destined for two different uplinks.

Figure 7:
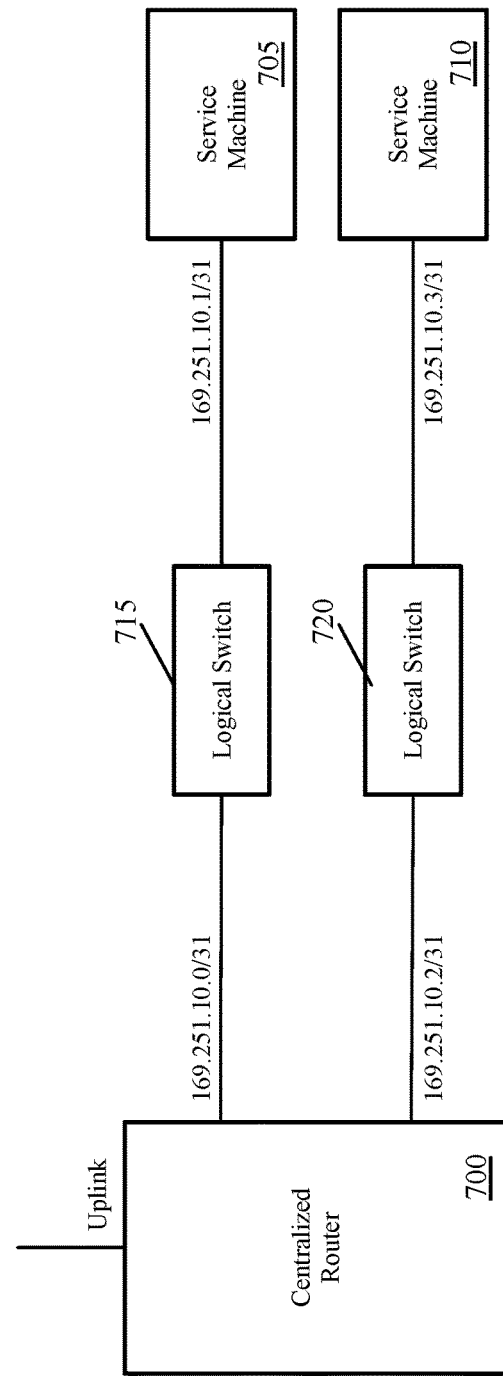
FIG. 7 conceptually illustrates a centralized routing component with two service attachment interfaces that each connect to a different service machine of two service machines via separate logical switches.

FIG. 7 conceptually illustrates a centralized routing component 700 with two service attachment interfaces that each connect to a different service machine of two service machines 705 and 710 via separate logical switches 715 and 720. As in the previous example, these two service machines could provide two separate services or be master and standby machines for a single high-availability service. In this example, the centralized routing component has a single uplink; some embodiment using this configuration would include two additional service attachments corresponding to each additional uplink that connect via separate logical switches to separate interfaces on each of the service machines. In these examples, using separate interfaces on the service machines corresponding to each different uplink allows the service machines to apply specific processing configurations to data messages sent to or received from each different uplink.

In addition to these various different topologies, the third-party service machines may be connected to the centralized routing component via different types of connections in some embodiments. Specifically, some embodiments allow for service machines to be connected in either (i) an L2 bump-in-the-wire mode or (ii) a L3 one-arm mode. In the L2 mode, shown in FIGS. 10 and 11, two interfaces of the logical router are connected to two separate interfaces of the service machine via two separate logical switches, and data traffic sent to the service machine via one of the interfaces and received back from the service machine via the other interface. Data traffic may be sent to the service machine via one interface for traffic entering the logical network and via the other interface for traffic exiting the logical network.

Figure 8:
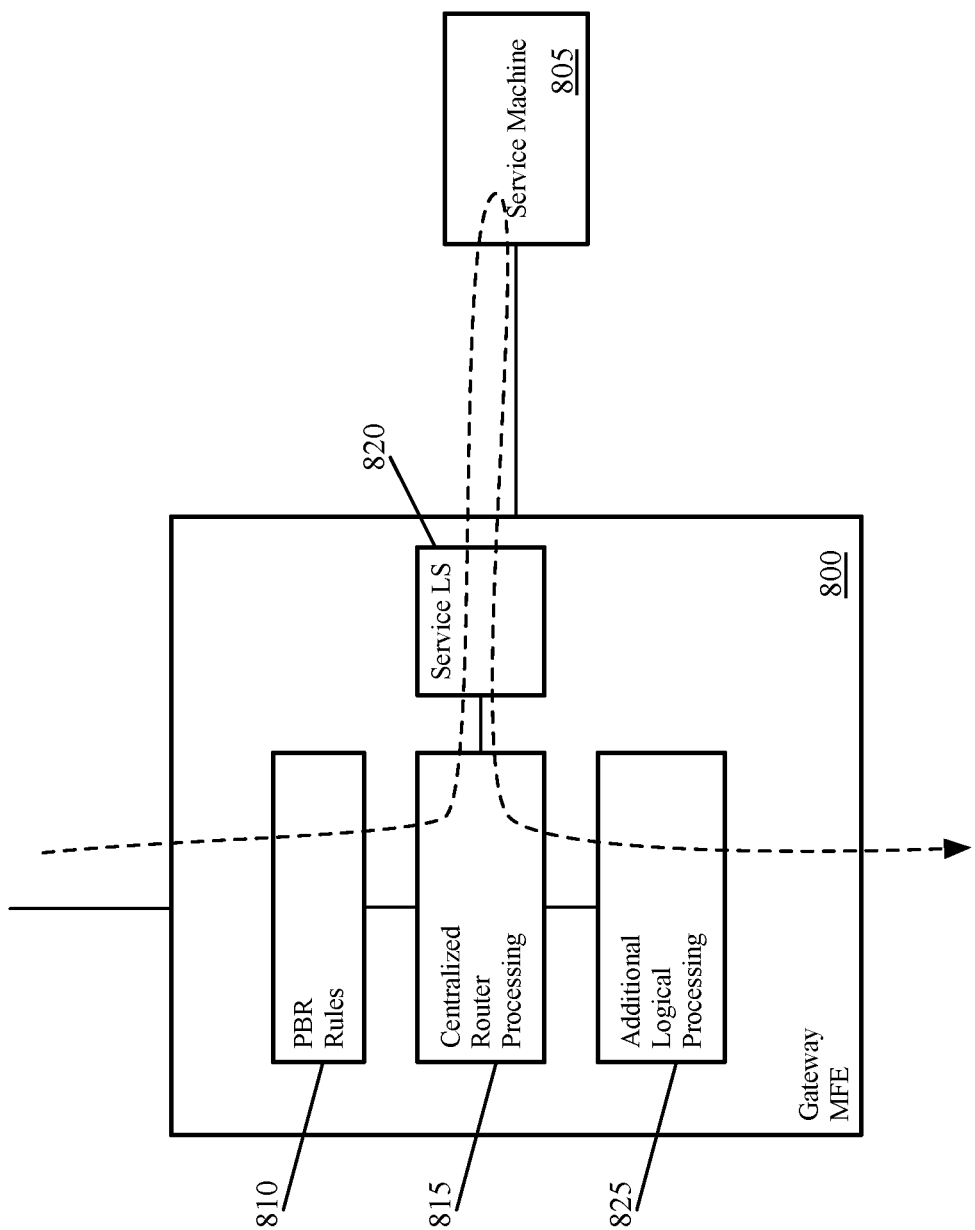
FIG. 8 illustrates the path of an ingress data message through multiple stages of logical processing implemented by a gateway managed forwarding element and a third-party service machine connected in L3 one-arm mode.
Figure 9:
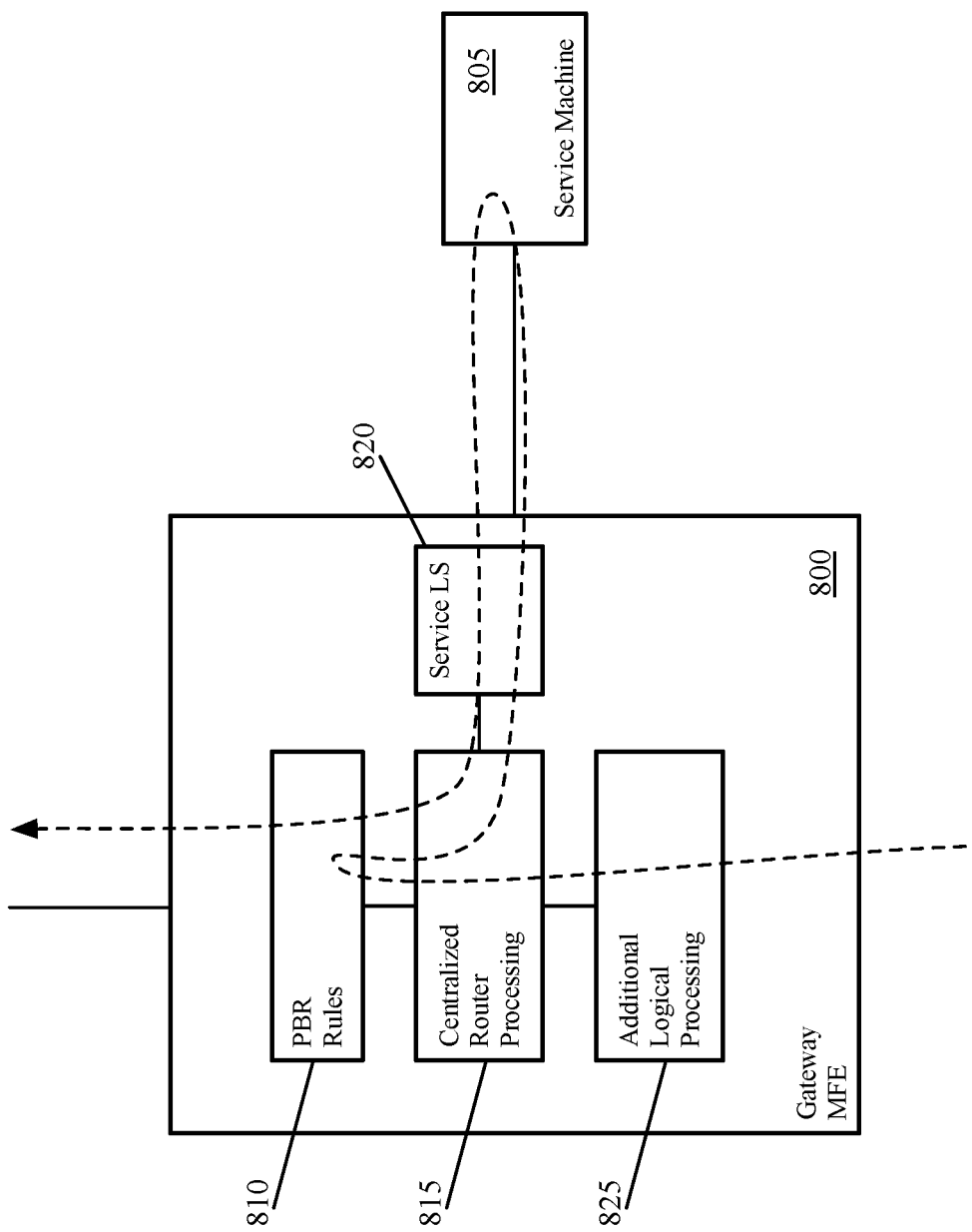
FIG. 9 illustrates the path of an egress data message through the multiple stages of logical processing implemented by the gateway MFE and the third-party service machine of FIG. 8.

In the L3 mode, shown in FIGS. 8 and 9, a single interface is used on the logical router for each connection with the service machine. Once configured, the gateway redirects some or all of the data traffic between the logical network and external networks to the service machine. As mentioned, some embodiments use a set of policy-based routing (PBR) rules to determine whether or not to redirect each data message. In some embodiments, the gateway applies these PBR rules to outgoing data messages after performing logical routing for the data messages, and applies the PBR rules to incoming data messages prior to performing logical routing and/or switching for incoming data messages.

FIG. 8 illustrates the path of an ingress data message (represented by the dashed line) through multiple stages of logical processing implemented by a gateway managed forwarding element 800 and a third-party service machine 805. As mentioned, in this example, the third-party service machine is connected in an L3 one-arm mode. In this mode, data messages are transmitted to the network address of the third-party service machine, which transmits the data messages back to the network address of the logical router service attachment interface.

The gateway MFE 800 implements several stages of logical network processing, including policy-based routing (PBR) redirection rules 810, centralized routing component processing 815, the service attachment logical switch processing 820, and additional logical processing 825 (e.g., transit logical switch processing, distributed routing component processing, processing for other tiers of logical routers and/or logical switches to which network endpoints connect, etc. In some embodiments, the gateway MFE 800 is a datapath in a bare metal computer or a virtual machine (e.g., a data plane development kit (DPDK)-based datapath). The gateway MFE of other embodiments executes a datapath in virtualization software of a host machine. Yet other embodiments implement a portion of the logical processing in such a datapath while implementing the centralized routing component in a virtual machine, namespace, or similar construct.

For the incoming data message in FIG. 8, the gateway MFE 800 applies the PBR rules 810 to determine whether to redirect the data message before processing the data message through any of the logical forwarding elements. In some embodiments, the gateway MFE also performs additional operations before applying the PBR rules, such as IPSec and/or other locally-applied services. The PBR rules, described in further detail below, identify whether a given data message will be redirected (e.g., based on various data message header fields, such as the source and/or destination IP addresses), how to redirect the data messages that match specific sets of header field values, etc. In this case, the PBR rules 810 specify to redirect the data message to the interface of the third-party service machine 805.

Based on this determination, the centralized routing component processing 815 identifies that the redirection interface corresponds to the service attachment logical switch, so the gateway MFE 800 then executes this logical switch processing 820. Based on this logical switch processing, the gateway MFE transmits the data message (e.g., with encapsulation) to the third-party service machine 805. This service machine 805 performs its service processing (e.g., firewall, NAT, cloud extension, etc.) and returns the data message to the gateway MFE (unless the service drops/blocks the data message). Upon return of the data message from the service, the gateway MFE then performs the centralized routing component processing 815 (e.g., routing based on the destination network address) and, in turn, the additional logical processing operations 825. In some embodiments, data messages returning from the third-party service machine are marked with a flag to indicate that the PBR rules do not need to be applied again. Based on these operations, the gateway MFE 800 transmits the data message to its destination in the logical network (e.g., by encapsulating the data message and transmitting the data message to a host machine in the data center).

FIG. 9 illustrates the path of an egress data message (represented by the dashed line) through the multiple stages of logical processing implemented by the gateway MFE 800 and the third-party service machine 805. Upon receipt of the data message, the gateway MFE 800 first applies any logical network processing 825 required before the centralized routing component, such as the transit logical switch (between the distributed routing component and the centralized routing component). In some cases, a tier-1 logical router will also have a centralized routing component implemented on the gateway MFE, in which case the additional logical processing may include this centralized routing component, the distributed routing component of the tier-0 logical router, the transit logical switches between them, etc.

The centralized routing component processing 815 identifies the uplink interface as its output interface, which leads to application of the PBR rules 810. These rules, in this case, also redirect outgoing data messages to the service machine 805, so the gateway MFE 800 applies the centralized routing component processing 815 again and subsequently the service attachment logical switch processing 820, and transmits the data message to the third-party service machine 805. Assuming the data message is not dropped by the service machine 805, the gateway MFE 800 receives the data message via its interface corresponding to the service attachment logical switch. At this point, the centralized routing component processing 815 again identifies the uplink as the output interface for that component, and the gateway MFE transmits the data message to the external physical network router associated with the uplink. As mentioned, the data message is marked with a flag upon being received from the service machine 805 so that the gateway MFE does not apply the PBR rules 810 again in some embodiments.

If the service machine is logically connected to a tier-1 logical router, then in some embodiments the PBR rules are applied (for egress data messages) after the tier-1 logical router processing, and before the tier-0 logical router processing. Upon return from the service machine, the gateway MFE then applies the tier-0 distributed routing component, transit logical switch, and tier-0 centralized routing component. Ingress traffic is handled similarly, with the application of the PBR rules after the tier-0 distributed routing component and prior to application of the tier-1 centralized routing component.

Figure 10:
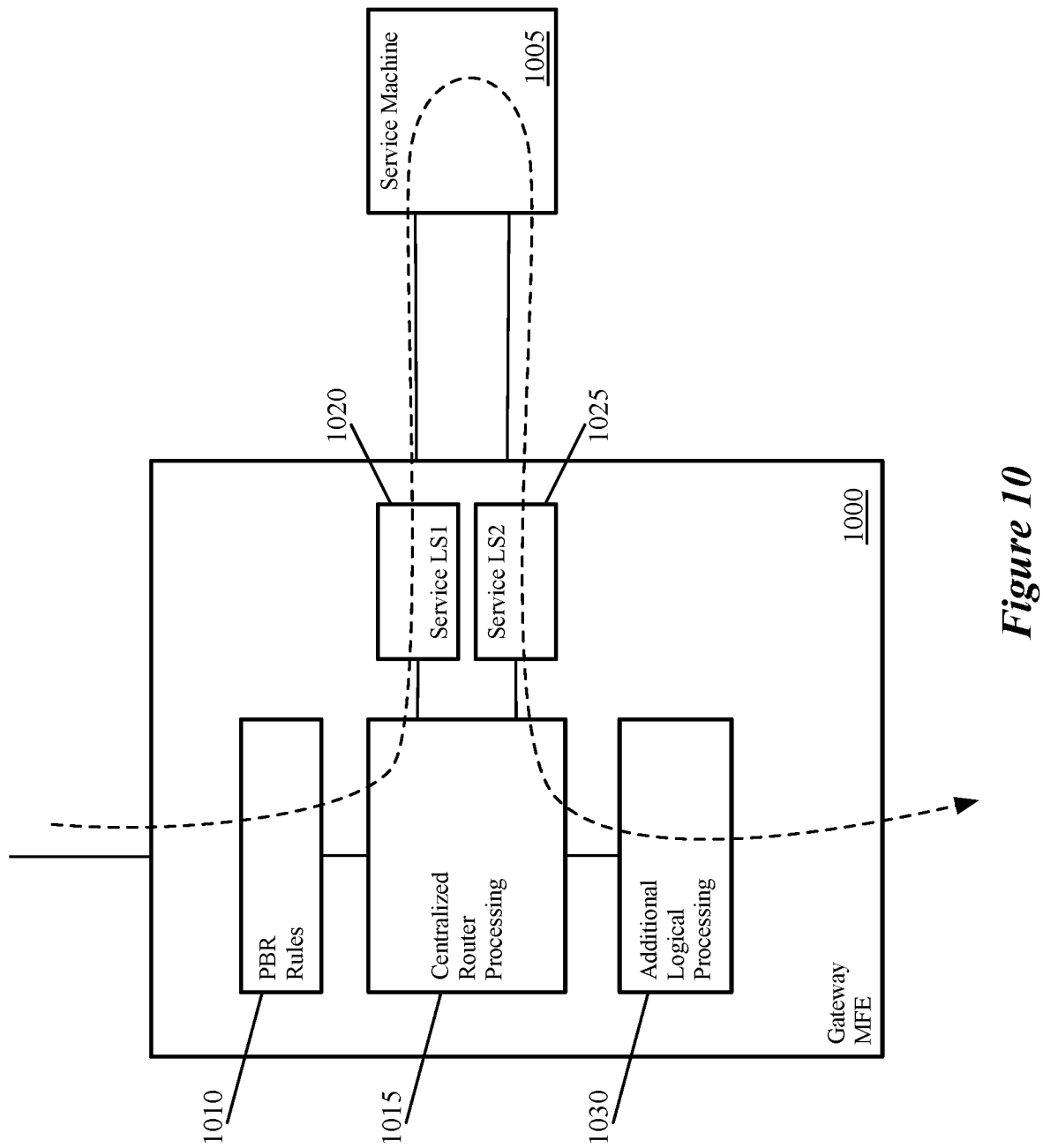
FIG. 10 illustrates the path of an ingress data message through multiple stages of logical processing implemented by a gateway MFE and a third-party service machine connected in L2 bump-in-the-wire mode.
Figure 11:
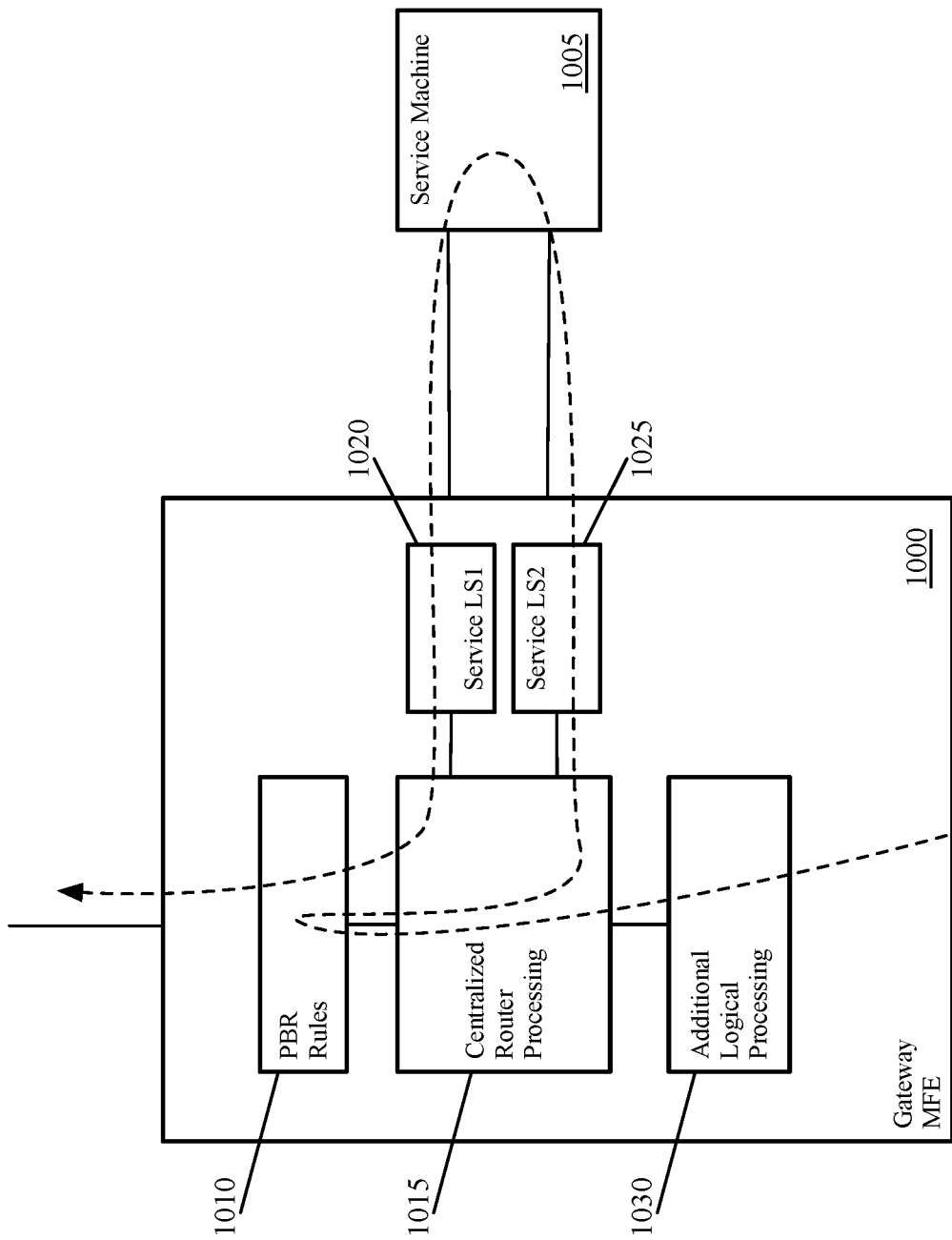
FIG. 11 illustrates the path of an egress data message through the multiple stages of logical processing implemented by the gateway MFE and the third-party service machine of FIG. 10.

As indicated above, FIGS. 10 and 11 illustrate the connection of a service machine to a centralized routing component using L2 bump-in-the-wire mode. FIG. 10 illustrates the path of an ingress data message (represented by the dashed line) through multiple stages of logical processing implemented by a gateway MFE 1000 and a third-party service machine 1005. In the L2 bump-in-the-wire mode, two interfaces of the logical router are associated with each connection to the service machine 1005. Data messages are transmitted to the service machine via one of the interfaces and returned via the other interface.

As in the example of FIGS. 8 and 9, the gateway MFE 1000 implements PBR redirection rules 1010, centralized routing component processing 1015, and additional logical processing 1030. Because there are two separate interfaces for the connection to the service machine 1005, the gateway MFE 1000 also implements two separate service attachment logical switches 1020 and 1025. In some embodiments, the interface associated with the first logical switch 1020 is an "untrusted" interface, while the interface associated with the second logical switch 1025 is a "trusted" interface. In this figure, each of the centralized routing component service attachment interfaces is associated with a separate interface of the gateway MFE 1000. In other embodiments, however, these service attachment interfaces share one gateway MFE interface.

For the incoming data message in FIG. 10, the gateway MFE 1000 applies the PBR rules 1010 to determine whether to redirect the data message before processing the data message through any of the logical forwarding elements. In some embodiments, the gateway MFE also performs additional operations before applying the PBR rules, such as IPSec and/or other locally-applied services. The PBR rules, described in further detail below, identify whether a given data message will be redirected (e.g., based on various data message header fields, such as the source and/or destination IP addresses), how to redirect the data messages that match specific sets of header field values, etc. In this case, the PBR rules 1010 specify to redirect the data message to the interface of the third-party service machine 805 that is associated with the first logical switch 1020.

Based on this determination, the centralized routing component processing 815 identifies that the redirection interface corresponds to the first service attachment logical switch 1020. Because the service machine 1005 is connected in L2 bump-in-the-wire mode, the centralized routing component uses the MAC address of this interface as the source address for the redirected data message and the MAC address of the other service attachment interface (connected to the second logical switch 1025) as the destination address). This causes the data message to be returned by the service machine 1005 to this second (trusted) interface.

The gateway MFE 1000 then executes the logical switch processing 1020 and, based on this logical switch processing, transmits the data message to the third-party service machine 1005. This service machine 1005 performs its service processing (e.g., firewall, NAT, cloud extension, etc.) and returns the data message to the gateway MFE (unless the service drops/blocks the data message). Upon return of the data message from the service, the gateway MFE identifies the second logical switch 1025 for processing based on the destination address of the data message and/or the gateway MFE interface on which the message is received, then performs the processing for the centralized routing component 1015 (e.g., routing based on the destination network address) and, in turn, the additional logical processing operations 1030. In some embodiments, data messages returning from the third-party service machine are marked with a flag to indicate that the PBR rules do not need to be applied again. Based on these operations, the gateway MFE 800 transmits the data message to its destination in the logical network (e.g., by encapsulating the data message and transmitting the data message to a host machine in the data center).

FIG. 11 illustrates the path of an egress data message (represented by the dashed line) through the multiple stages of logical processing implemented by the gateway MFE 1000 and the third-party service machine 1005, connected in L2 bump-in-the-wire mode. Upon receipt of the data message, the gateway MFE 1000 first applies any logical network processing 1030 required before the centralized routing component, such as the transit logical switch (between the distributed routing component and the centralized routing component). In some cases, a tier-1 logical router will also have a centralized routing component implemented on the gateway MFE, in which case the additional logical processing 1030 may include this centralized routing component, the distributed routing component of the tier-0 logical router, the transit logical switches between them, etc.

The centralized routing component processing 1015 then identifies the uplink interface as its output interface, which leads to application of the PBR rules 1010. These rules, in this case, redirect outgoing data messages to the service machine 805 via the trusted interface attached to the second logical switch 1025. Thus, the gateway MFE 800 applies the centralized routing component processing 1015 again and subsequently the processing for the second service attachment logical switch 1025, and transmits the data message to the third-party service machine 1005. In this direction, the data message has the trusted interface MAC address as its source address and the untrusted interface MAC address as its destination address, traversing the opposite path from the centralized routing component 1015 to the service machine 1005 and back as for an ingress data message.

Assuming the data message is not dropped by the service machine 1005, the gateway MFE 800 receives the data message via its interface corresponding to the first service attachment logical switch 1020. At this point, the centralized routing component processing 1015 again identifies the uplink as the output interface, and the gateway MFE transmits the data message to the external physical network router associated with the uplink. As mentioned, the data message is marked with a flag upon being received from the service machine 1005 so that the gateway MFE does not apply the PBR rules 1010 again in some embodiments.

In some embodiments, the PBR rules use a two-stage lookup to determine whether to redirect a data message (and to which interface to redirect the data message). Specifically, rather than the PBR rules providing the redirection details directly, each rule specifies a unique identifier. Each identifier corresponds to a service machine, and the gateway stores a dynamically-updated data structure for each identifier that provides details about how to redirect data messages.

Figure 12:
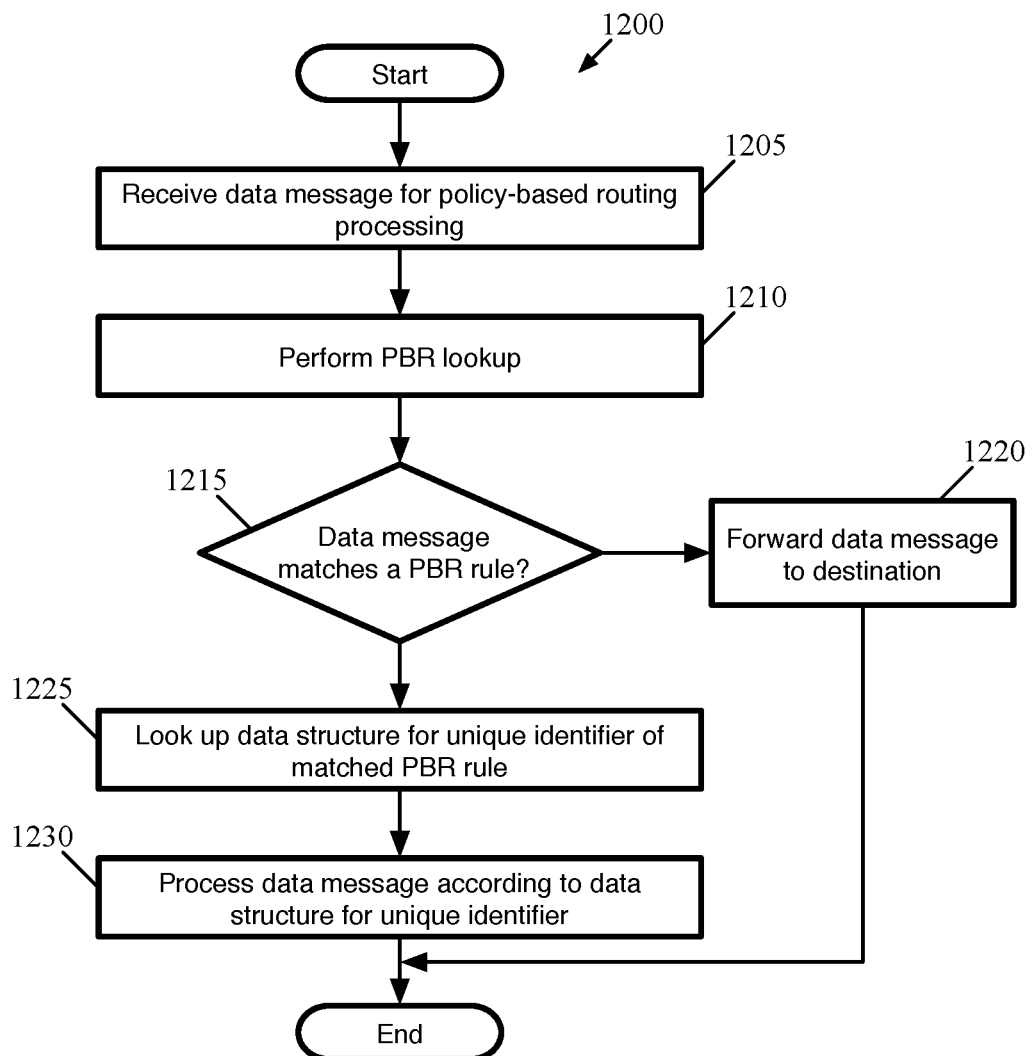
FIG. 12 conceptually illustrates a process of some embodiments for applying policy-based routing redirection rules to a data message.

FIG. 12 conceptually illustrates a process 1200 of some embodiments for applying policy-based routing redirection rules to a data message. In some embodiments, the process 300 is performed by a gateway MFE such as those shown in FIGS. 8-11, when applying the PBR rules to either an incoming (from an external network) or outgoing (from the logical network) data message. This process 1200 will be described in part by reference to FIG. 13, which illustrates a set of PBR rules and data structures for some of these rules.

As shown, the process 1200 begins by receiving (at 1205) a data message for PBR processing. This may be a data message received via a logical router uplink from an external network or a data message sent by a logical network endpoint for which the gateway MFE has already identified the uplink as the egress port for the centralized routing component. In some embodiments, the process 1200 is not applied to data messages for which a flag is set indicating that the data message is received from a third-party service machine. These data messages are The process 1200 then performs (at 1210) a lookup into a set of PBR rules. In some embodiments, these rules are organized as a set of flow entries, with match conditions and actions for data messages that match each set of match conditions. Depending on the context of the gateway datapath, the PBR rules of some embodiments use a hash table (or set of hash tables) using one or more hashes of sets of data message header fields. Other embodiments use other techniques to identify a matching PBR rule.

Figure 13:
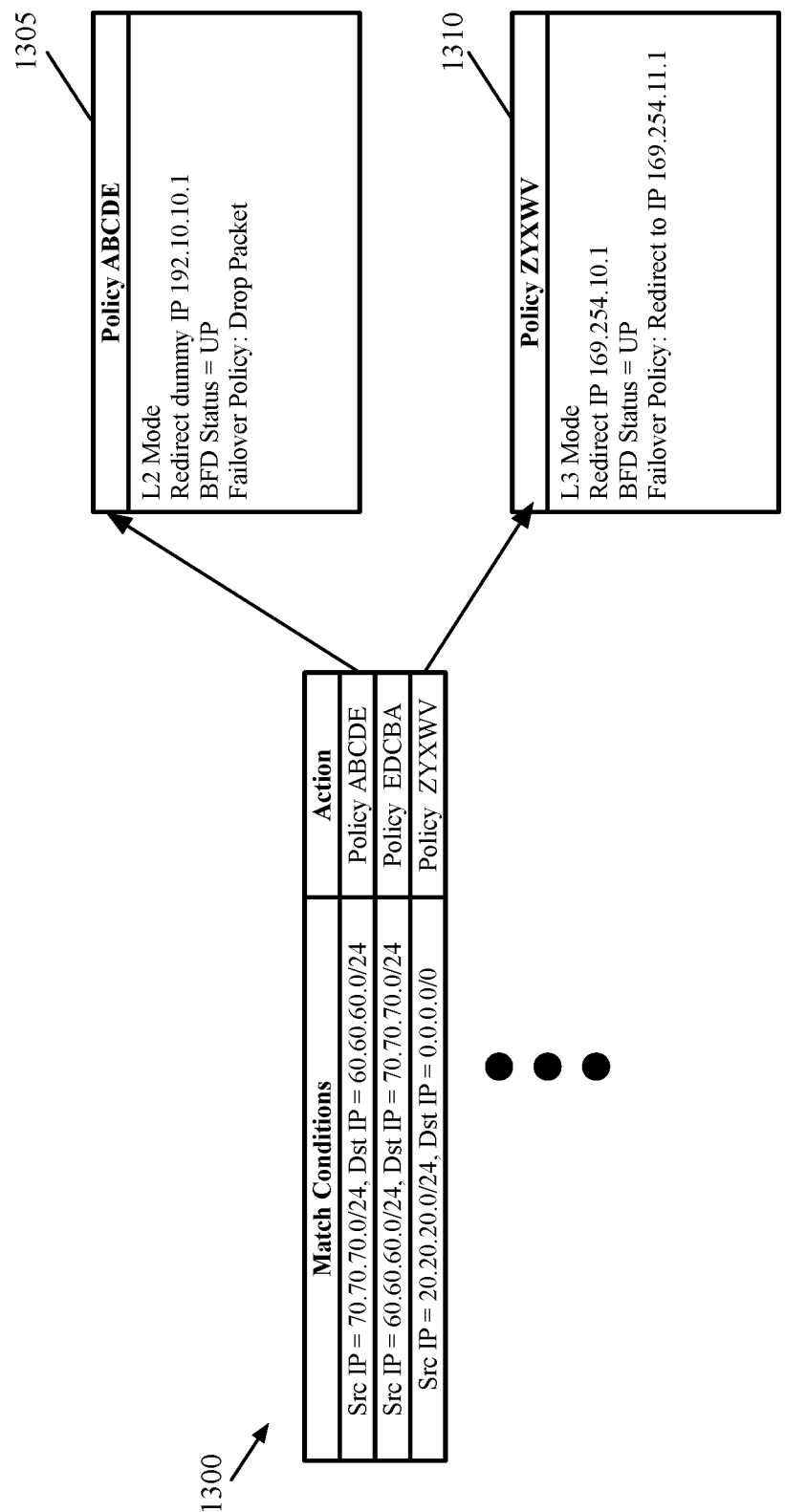
FIG. 13 illustrates a table of policy-based routing rules.

FIG. 13 illustrates a table of PBR rules 1300. In this case, the rules all match on the source and destination IP addresses, but PBR rules of some embodiments can also match on other header fields (and combinations of other header fields with source and/or destination IP addresses). For example, the first two match conditions are inverses of each other, one for handling ingress data messages (from 70.70.70.0/24 in an external network to the 60.60.60.0/24 subnet in the logical network), and the other for handling the corresponding egress data messages. The third match condition matches on any data message sent from the source subnet 20.20.20.0/24 (i.e., irrespective of the destination address). As described further below, the actions specify unique policy identifiers rather than specific redirection actions.

Returning to FIG. 12, the process 1200 determines (at 1215) whether the data message matches any of the PBR rules based on the PBR lookup. In some embodiments, the PBR rules table includes a default (lowest priority) rule (or set of rules) for data messages that do not match any of the other rules. If the data message does not match any PBR rules (or only matches a default rule), the process forwards (at 1220) the data message to its destination without any redirection. Thus, outgoing data messages are transmitted to the appropriate physical router (after performing any additional IPSec or other local service processing), while incoming data messages begin logical processing at the centralized logical router.

On the other hand, if the data message matches one of the PBR rules, the process looks up (at 1225) a data structure for a unique identifier specified by the matched PBR rule. As shown in FIG. 13, the actions for each of the PBR rules do not directly specify to redirect matching data messages to a particular next hop address. Instead, these actions specify unique policy identifiers, which in turn map to corresponding dynamically-updated data structures. That is, the gateway MFE is configured to store a data structure for each unique identifier specified in a PBR action. These data structures may be database table entries or any other type of modifiable data structure. In some embodiments, the gateway MFE is configured to some or all fields of the data structures based on, e.g., current network conditions.

These data structures, in some embodiments, indicate the type of connection to the service (e.g., L2 bump-in-the-wire or L3 one-arm), a network address for the interface of the service to which the data message is redirected, dynamically-updated status data, and a failover policy. The status data is dynamically updated based on the health/reachability of the service, which may be tested using a heartbeat protocol such as bidirectional forwarding detection (BFD). The failover policy, in some embodiments, specifies what to do with the data message if the service is not reachable.

FIG. 13 illustrates the contents of two of these data structures. The data structure 1305, for unique identifier ABCDE, indicates that the service machine to which this policy redirects is connected in L2 bump-in-the-wire mode (such that opposite direction data messages that match the second PBR rule would be redirected to the same service machine in the opposite direction). The data structure 1305 also indicates a dummy IP address to use for redirection. This dummy IP is not actually the address of the service machine, but instead resolves to the MAC address of the service attachment interface of the centralized routing component via which the data message will return (e.g., for ingress data messages, the trusted interface of the centralized routing component). This address resolution may be performed with statically configured ARP entries in some embodiments.

In addition, the data structure 1305 specifies the current BFD status of the connection to the service machine (the connection is currently up) as well as a failover policy indicating how to handle the data message if the BFD status is down. It should be noted that while these examples use BFD, other mechanisms for monitoring the reachability of the service machine may be used as well (e.g., other heartbeat protocols, other measures of connection status, etc.). In this case, the failover policy indicates that data messages should be dropped if the service machine is not available. Other failover policy options may include, e.g. forwarding the data message to its destination without redirection to the service, redirection to a backup service machine, etc.

The data structure 1310, for unique identifier ZYXWV, indicates that the service machine to which this policy redirects is connected in L3 one-arm mode, and thus the redirection IP address provides the address of the service machine interface (rather than a dummy IP). The BFD status of this connection is also up, but in this case the failover policy provides for redirection to a backup service machine at a different IP address on a different subnet (i.e., connected to a different logical switch).

Returning to FIG. 12, the process 1200 processes (at 1230) the data message according to the instructions in the data structure for the unique identifier. This may include redirecting the data message to the next hop IP address specified by the data structure, dropping the data message if the connection is down and the failure policy specifies to drop the data message, or forwarding the data message according to the logical network processing if the connection is down and the failure policy specifies to ignore the redirection.

As noted, the data structures for each redirection policy are updated dynamically by the gateway MFE. In some embodiments, a BFD thread executes on the gateway machine to (i) send BFD messages to the service machine and (ii) receive BFD messages from the service machine. For service machines connected in L3 one-arm mode, the service machines also execute a BFD thread that sends BFD messages to the gateway. On the other hand, in L2 bump-in-the-wire mode, the BFD thread sends BFD messages out one of the interfaces connecting the centralized routing component to the service machine and receives these messages back on the other interface. Some such embodiments send the BFD messages out through both interfaces (with BFD messages sent from the trusted interface received at the untrusted interface, and vice versa). This process is described in greater detail in U.S. patent application Ser. No. 15/937,615, now published as U.S. Patent Publication 2019/0306086, which is incorporated herein by reference. In some embodiments, one BFD thread executes on each gateway MFE and exchanges messages with all of the connected service machines, while in other embodiments separate BFD threads execute on a gateway MFE to exchange messages with each connected service machine. When the BFD thread detects that BFD messages are no longer being received from a particular service machine, the gateway MFE modifies the data structure for that service machine.

Figure 14:
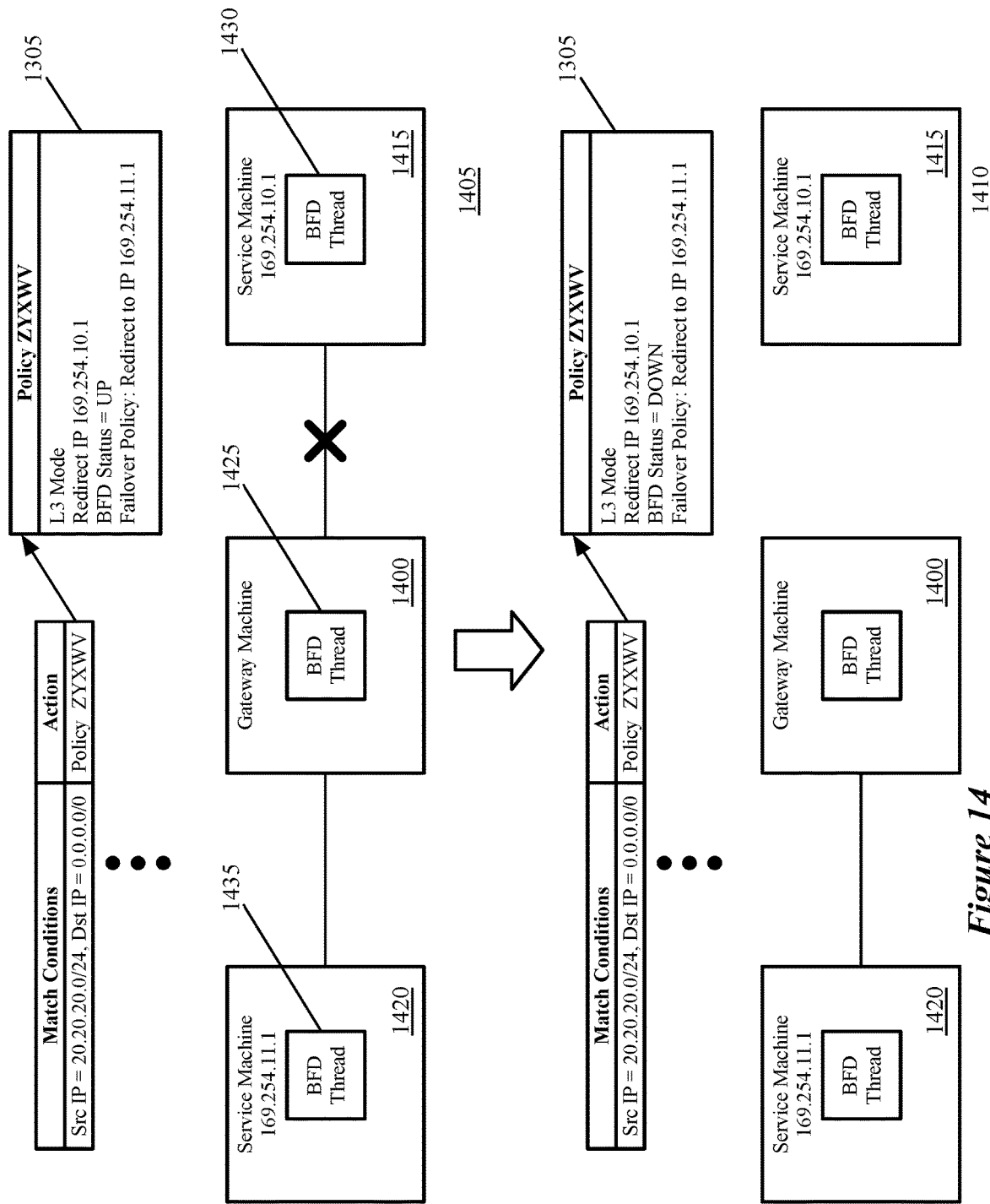
FIG. 14 conceptually illustrates the data structure being dynamically updated based on a change in the connection status of the service machine to which the data structure redirects data messages.

FIG. 14 conceptually illustrates the data structure 1310 being dynamically updated based on a change in the connection status of the service machine to which the data structure redirects data messages. This figure illustrates both the data structure 1310 as well as connections between the gateway machine 1400 and two service machines 1415 and 1420 over two stages 1405 and 1410.

In the first stage 1405, the data structure 1310 is in the same state as in FIG. 13, indicating that the connection to the service machine endpoint interface 169.254.10.1 is currently up as per the BFD status. The gateway machine 1400, in addition to operating the gateway MFE with its logical network processing, PBR rules, etc. also executes a BFD thread 1425. This BFD thread 1425 sends BFD messages to both the first service machine 1415 at its interface with IP address 169.254.10.1 and the second service machine 1420 at its interface with IP address 169.254.11.1 at regular intervals. In addition, each of these service machines 1415 and 1420 execute their own BFD threads 1430 and 1435, respectively, which send BFD messages to the gateway machine at regular intervals. As shown by the large X, at this stage 1405 the connection between the gateway machine 1400 and the first service machine 1415 goes down. This could occur due to a physical connection issue, an issue with the service machine 1415 crashing, etc. As a result, the BFD thread 1425 would no longer receive BFD messages from the service machine 1415.

In the second stage 1410, the connection between the gateway machine 1400 and the service machine 1415 is no longer present. In addition, the data structure 1305 has been dynamically updated by the gateway MFE to indicate that the BFD status is down. As a result of the failover policy specified by this data structure 1305, data messages with a source IP in the subnet 20.20.20.0/24 would be redirected to the 169.254.11.1 interface of the second service machine 1420 until the connection to the first service machine 1415 comes back up.

In some embodiments, multiple threads can write to the data structures 1305 and 1310. For instance, some embodiments allow the BFD thread as well as a configuration receiver thread to both write to these data structures (e.g., to modify the BFD status as well as to make any configuration changes received from the network control system). In addition, one or more packet processing threads are able to read these data structures for performing packet lookups. Some embodiments enable these packet processing threads to read from the data structures even if one of the writer threads is currently accessing the structures, so that packet processing is not interrupted by the writer threads.

Figure 15:
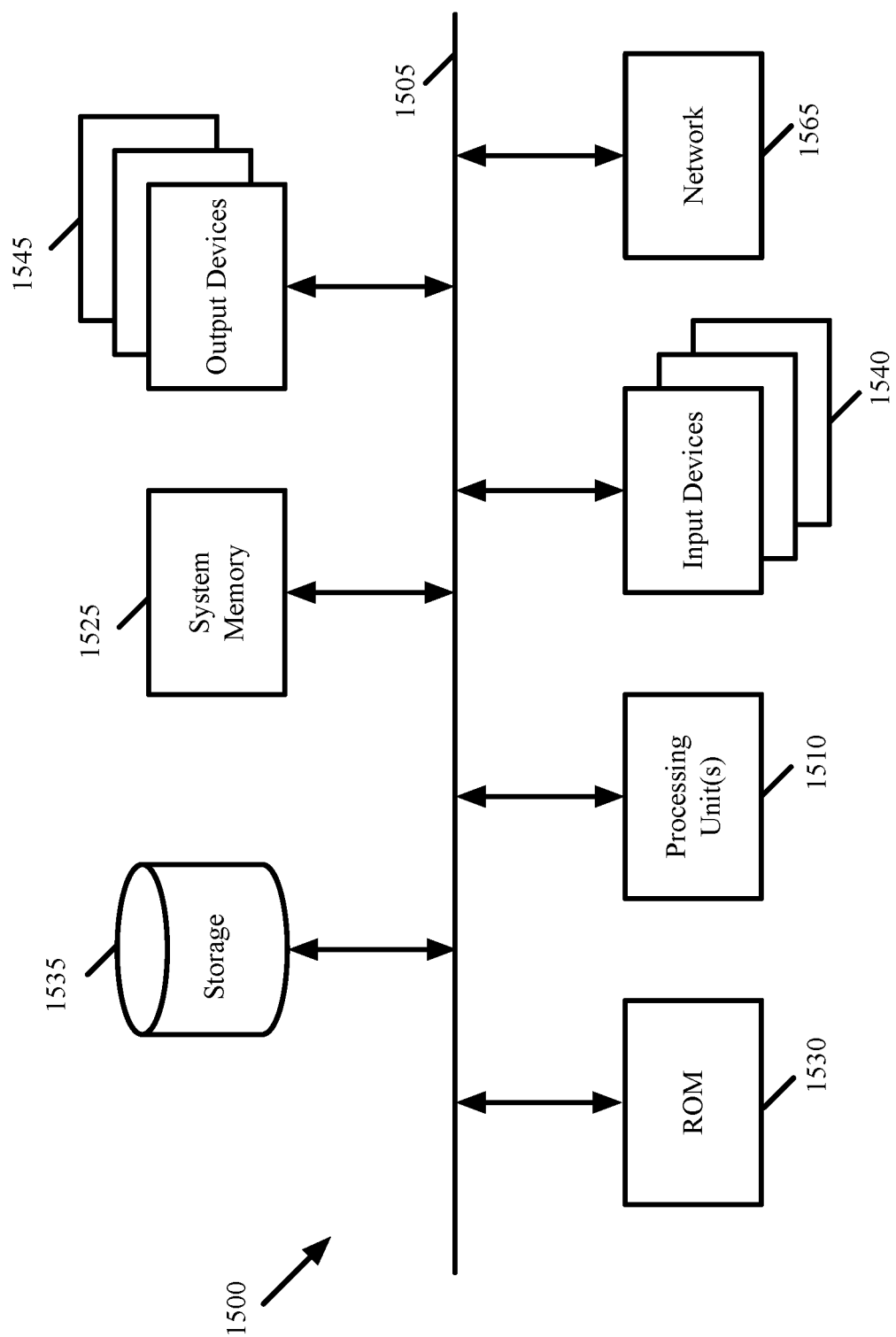
FIG. 15 conceptually illustrates an electronic system with which some embodiments of the invention are implemented.

FIG. 15 conceptually illustrates an electronic system 1500 with which some embodiments of the invention are implemented. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random-access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 10 and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for forwarding a data message, the method comprising:

performing a lookup to map a set of header fields of the data message to a particular identifier corresponding to a particular service that performs non-forwarding processing on data messages, wherein the particular identifier is one of a plurality of identifiers to which header fields of data messages are mapped, each identifier corresponding to a different service and associated with a separate dynamically-updated data structure comprising instructions for forwarding data messages to the corresponding service;

using a particular dynamically-updated data structure associated with the particular identifier to retrieve instructions for forwarding data messages to the particular service; and forwarding the data message according to the retrieved instructions from the particular data structure associated with the particular identifier, wherein the particular dynamically-updated data structure associated with the particular identifier specifies (i) an IP address for reaching the particular service, (ii) a reachability status of the particular service, and (iii) a failover policy for when the particular service is not reachable.

2. The method of claim 1, wherein the method is performed by a gateway for a logical network implemented in a datacenter, the gateway for processing data messages between logical network endpoints operating in the datacenter and physical networks external to the datacenter.

3. The method of claim 2, wherein:

the logical network comprises (i) at least one logical switch to which the logical network endpoints connect and (ii) a logical router;

the logical router comprises a distributed routing component and one or more centralized routing components; and the gateway implements one of the centralized routing components to process data messages between the logical network endpoints and the physical networks external to the datacenter.

4. The method of claim 1, wherein the lookup comprises a policy-based routing decision.

5. The method of claim 1, wherein the set of header fields comprises at least a source network address of the data message.

6. The method of claim 1, wherein the particular service is a third-party service virtual machine.

7. The method of claim 1, wherein the reachability status is dynamically updated based on a reachability protocol.

8. The method of claim 1, wherein the particular service is connected using a layer 2 (L2) bump in the wire mode, wherein the IP address is a dummy address that corresponds to an interface of a gateway that forwards the data message.

9. The method of claim 8, wherein the interface is a first interface, wherein the gateway executes a bidirectional forwarding detection (BFD) thread that sends BFD messages to the particular service through a second interface and receives the BFD messages from the particular service through the first interface.

10. The method of claim 1, wherein the IP address is an address for a machine that implements the particular service.

11. The method of claim 1, wherein the failover policy specifies to drop data messages when the particular service is not reachable.

12. The method of claim 1, wherein the failover policy specifies to route data messages based on the destination network address when the particular service is not reachable.

13. The method of claim 1, wherein the failover policy specifies a backup service to which to redirect the data messages when the particular service is not reachable.

14. The method of claim 1, wherein:
  performing the lookup comprises matching the set of header fields to a policy-based routing rule comprising a set of match conditions and an action specifying the particular identifier;
  the policy-based routing rule is one of a plurality of policy-based routing rules with actions specifying different identifiers corresponding to different services.

15. A non-transitory machine-readable medium storing a program which when executed by at least one processing unit forwards a data message, the program comprising sets of instructions for:
  performing a lookup to map a set of header fields of the data message to a particular identifier corresponding to a particular service that performs non-forwarding processing on data messages, wherein the particular identifier is one of a plurality of identifiers to which header fields of data messages are mapped, each identifier corresponding to a different service and associated with a separate dynamically-updated data structure comprising instructions for forwarding data messages to the corresponding service;
  using a particular dynamically-updated data structure associated with the particular identifier to retrieve instructions for forwarding data messages to the particular service; and
  forwarding the data message according to the retrieved instructions from the particular data structure associated with the particular identifier;
  wherein the particular dynamically-updated data structure associated with the particular identifier specifies (i) an IP address for reaching the particular service, (ii) a reachability status of the particular service, and (iii) a failover policy for when the particular service is not reachable.

16. The non-transitory machine-readable medium of claim 15, wherein the program is executed by a gateway machine for a logical network implemented in a datacenter, the gateway machine for processing data messages between logical network endpoints operating in the datacenter and physical networks external to the datacenter.

17. The non-transitory machine-readable medium of claim 16, wherein:
  the logical network comprises (i) at least one logical switch to which the logical network endpoints connect and (ii) a logical router;
  the logical router comprises a distributed routing component and one or more centralized routing components; and
  the gateway machine implements one of the centralized routing components to process data messages between the logical network endpoints and the physical networks external to the datacenter.

18. The non-transitory machine-readable medium of claim 15, wherein the set of header fields comprises at least a source network address of the data message.

19. The non-transitory machine-readable medium of claim 15, wherein the particular service is connected using a layer 2 (L2) bump in the wire mode, wherein the IP address is a dummy address that corresponds to an interface of a gateway that forwards the data message.

20. The non-transitory machine-readable medium of claim 15, wherein the IP address is an address for a machine that implements the particular service.

21. The non-transitory machine-readable medium of claim 15, wherein the failover policy specifies one of (i) dropping data messages, (ii) routing data messages based on the destination network address, and (iii) a backup service to which to redirect the data messages when the particular service is not reachable.

* * * * *